Sept. 24, 1957.

A. E. KITTREDGE 2,807,280

PROGRAM CONTROL VALVE

Filed July 20, 1953

INVENTOR
Arthur E. Kittredge,
BY
ATTORNEYS.

Sept. 24, 1957  A. E. KITTREDGE  2,807,280
PROGRAM CONTROL VALVE
Filed July 20, 1953  12 Sheets-Sheet 2

INVENTOR
Arthur E. Kittredge
BY
ATTORNEYS

Sept. 24, 1957　　　　　　A. E. KITTREDGE　　　　　　2,807,280
PROGRAM CONTROL VALVE

Filed July 20, 1953　　　　　　　　　　　　　　　　12 Sheets-Sheet 3

INVENTOR
Arthur E. Kittredge
BY
ATTORNEYS.

Sept. 24, 1957 A. E. KITTREDGE 2,807,280
PROGRAM CONTROL VALVE
Filed July 20, 1953 12 Sheets-Sheet 7

INVENTOR
Arthur E. Kittredge
BY
ATTORNEYS

Sept. 24, 1957 　　　　A. E. KITTREDGE　　　　2,807,280
PROGRAM CONTROL VALVE
Filed July 20, 1953　　　　　　　　　　　　　　　12 Sheets-Sheet 9

INVENTOR
Arthur E. Kittredge
BY
ATTORNEYS

Sept. 24, 1957　　　A. E. KITTREDGE　　　2,807,280
PROGRAM CONTROL VALVE
Filed July 20, 1953　　　　　　　　　　　　　　12 Sheets-Sheet 10

Inventor
Arthur E. Kittredge
By
Attorneys.

Sept. 24, 1957

A. E. KITTREDGE 2,807,280

PROGRAM CONTROL VALVE

Filed July 20, 1953

Inventor
Arthur E. Kittredge

By

Attorneys.

United States Patent Office 2,807,280
Patented Sept. 24, 1957

2,807,280

PROGRAM CONTROL VALVE

Arthur E. Kittredge, Audubon, N. J.

Application July 20, 1953, Serial No. 369,007

8 Claims. (Cl. 137—599.1)

The present invention relates to valves and ion exchange systems controlled thereby.

A purpose of the invention is to produce a more simple and inexpensive valve for controlling the program of an ion exchanger.

A further purpose is to produce an ion exchange valve which is resistant to dilute acids and very pure water.

A further purpose is to put an ion exchanger through the sequence of service, backwash, regeneration, rinse and return to service by a simple, inexpensive valve which will not frequently require maintenance, and which can readily be maintained.

A further purpose is to make up a valve by bonding together plates of plastic.

A further purpose is to produce a valve by thermoplastic welding of plates of a metal such as cast iron or steel.

A further purpose is to control the program of an ion exchanger by a multiplicity of three-way valves, preferably using a group of four such valves.

A further purpose is to connect one of the three-way valves which is connected at one side to the regeneration solution also to the drain during the service portion of the cycle so that any leakage of regenerating solution will not contaminate the service outlet water.

A further purpose is to connect one of the three-way valves which during service is closed against service inlet water also to the drain so that any leakage of service inlet water will not contaminate the service outlet water.

A further purpose is to control the sequence of three-way valves by a pilot valve desirably of rotary type, and preferably to mount the pilot valve in the same valve housing with interconnection to the ends of the three-way valves.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

In the prior art the valves which control the regenerating cycle of ion exchangers have generally been complicated and expensive. Furthermore it has been very difficult to obtain valves suitable for water conditioning to control the sequence of steps of the ion exchanger which are capable of standing up under exposure to dilute acids and which will not contaminate very pure water of very low electrical conductivity.

In order to function properly, a valve of this character should be highly resistant to dilute solutions of hydrochloric acid or sulphuric acid so that it will not be subject to attack, and should be highly resistant to the activity of low conductivity deionized water so that the material of the valve will not contaminate the water.

In order to be useful for this purpose, the valve should provide connections for maintaining the ion exchanger in service and for performing the functions of backwash, regeneration, rinse and return to service.

The valve of the present invention is capable of inexpensive manufacture, and can be exposed to dilute acids without serious harm to the valve, and will not contaminate very pure water of low electrical conductivity. The valve of the invention will carry the ion exchanger through the operating cycle. It can be operated manually or electrically by a small motor.

Furthermore the valve of the invention protects the system against contamination due to leakage. After long operation, any valve which must open and close frequently is likely to leak, and the valve construction of the present invention provides drainage connections to take away any leakage of hard water or of regenerant solution without permitting any such hard water or regenerant solution to contaminate the deionized water. Any leakage passes to a waste outlet or drain, and is preferably visible to the operator.

It will, of course, be evident that the valve of the invention can be modified to meet various operating requirements such as changes in the operating cycle.

In view of the fact that the volume of sales frequently does not permit tooling for high production, the valve of the present invention can be fabricated simply from low cost plate or slab materials, without requiring expensive tooling.

It is preferable to produce the valve of the invention from a plastic, suitable materials being phenol-formaldehyde, urea-formaldehyde, methyl methacrylate, and acrylic plastics modified for example by styrene. The plastics may be bonded together with adhesive, although preferably they are self-bonded as by solvent softening the plastic at the surface and then pressing together the plates or slabs to unite them. Any plastic used should have adequate resistance to solutions of dilute acid and should not contaminate deionized water. It should also be tough and strong and easily machined.

The valve may also be manufactured from slabs or plates of other materials, especially where it is not important to avoid contamination. Cast iron plates may be used, and they may be bonded together by thermoplastic adhesives, this process generally being known as Scotch welding. Suitable thermoplastic adhesives are chlorinated rubber, chlorinated neoprene, polyvinyl chloride, or the like. The ports can, of course, be cast in place and the meeting surfaces machined as by surface grinding. Valves constructed in this way can be disassembled by heating to release the thermoplastic Scotch welds.

Figure 34:
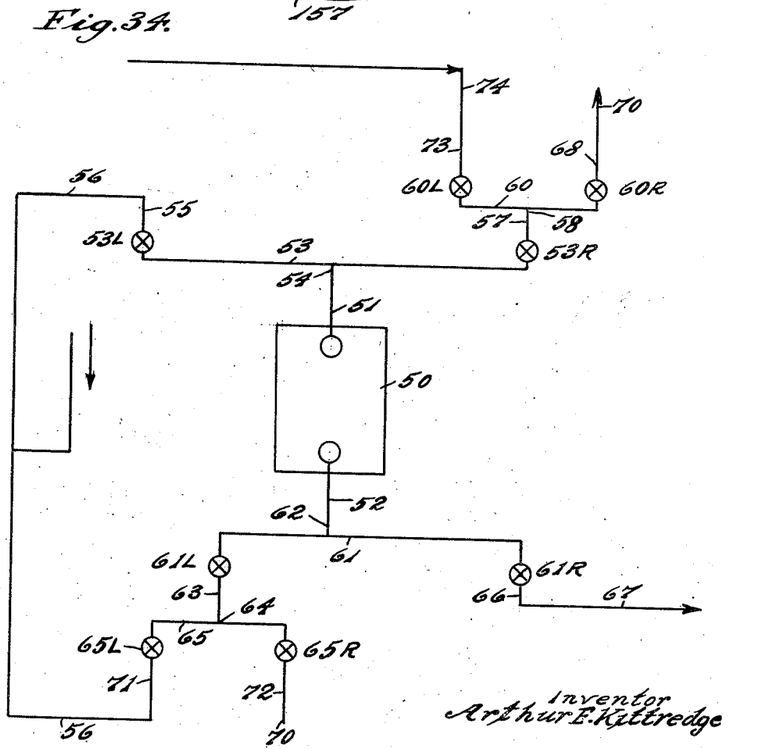
Figure 34 is a diagram of the connections of the three-way valves to the ion exchanger.

The valve of the invention preferably consists of a series of three-way valves connected as shown diagrammatically in Figure 34. Each three-way valve suitably has an intermediate port connection and two outside port connections, with a sliding valve element by which one of the ports, ordinarily the intermediate one, is connected alternately to one of the other two but not to both simultaneously.

Considering Figure 34, an ion exchanger 50 has a top connection 51 and a bottom connection 52. It may be of the type known as a cation exchanger or an anion exchanger or a combination of the two.

A first three-way valve 53 can be illustrated as consisting of two valve elements 53L and 53R, only one of which can be closed at the same time. The intermediate port 54 of the first three-way valve 53 is connected to the top of the ion exchanger. One of the outside ports 55 which is open to the intermediate port 54 when valve 53L is open is connected to the inlet service water 56. The other outside port 57 of the first three-way valve is connected to intermediate port 58 of the third three-way valve 60 when valve 53R is open.

The second three-way valve 61 has its intermediate port 62 connected with the bottom connection 52 of the ion exchanger. One outside port 63 of the second three-way valve 61 is connected to the intermediate port 64 of a fourth three-way valve 65 when valve 61L is open. The other outside port 66 of the second three-way valve 61 is connected to the service outlet 67 when valve 61R is open.

The other outside port 68 of third three-way valve 60 is connected to the waste connection or drain 70 when valve 60R is open. One outside port 71 of the fourth three-way valve 65 is connected to the service water inlet 56 when valve 65L is open. The other outside port 72 is connected to the waste connection or drain 70 when valve 65R is open.

The other outside port 73 of third three-way valve 60 is connected to a regenerant solution connection 74 when valve 60L is open.

The following table indicates which valves are open during the respective phases of the cycle, it being understood, of course, that the opposite valve is closed when one of the three-way valves is open.

| Function | Valve which is open | | | |
| --- | --- | --- | --- | --- |
| | 53 | 61 | 60 | 65 |
| Service | 53L | 61R | 60R | 65R |
| Backwash | 53R | 61L | 60R | 65L |
| Regeneration | 53R | 61L | 60L | 65R |
| Rinse | 53L | 61L | 60R | 65R |
| Service | 53L | 61R | 60R | 65R |

It will, of course, be evident that any suitable means such as fluid pressure means, or electrical means such as a solenoid may apply pressure to one end of each slide valve and connect exhaust at the other end to shift the slide valve.

Figure 1:
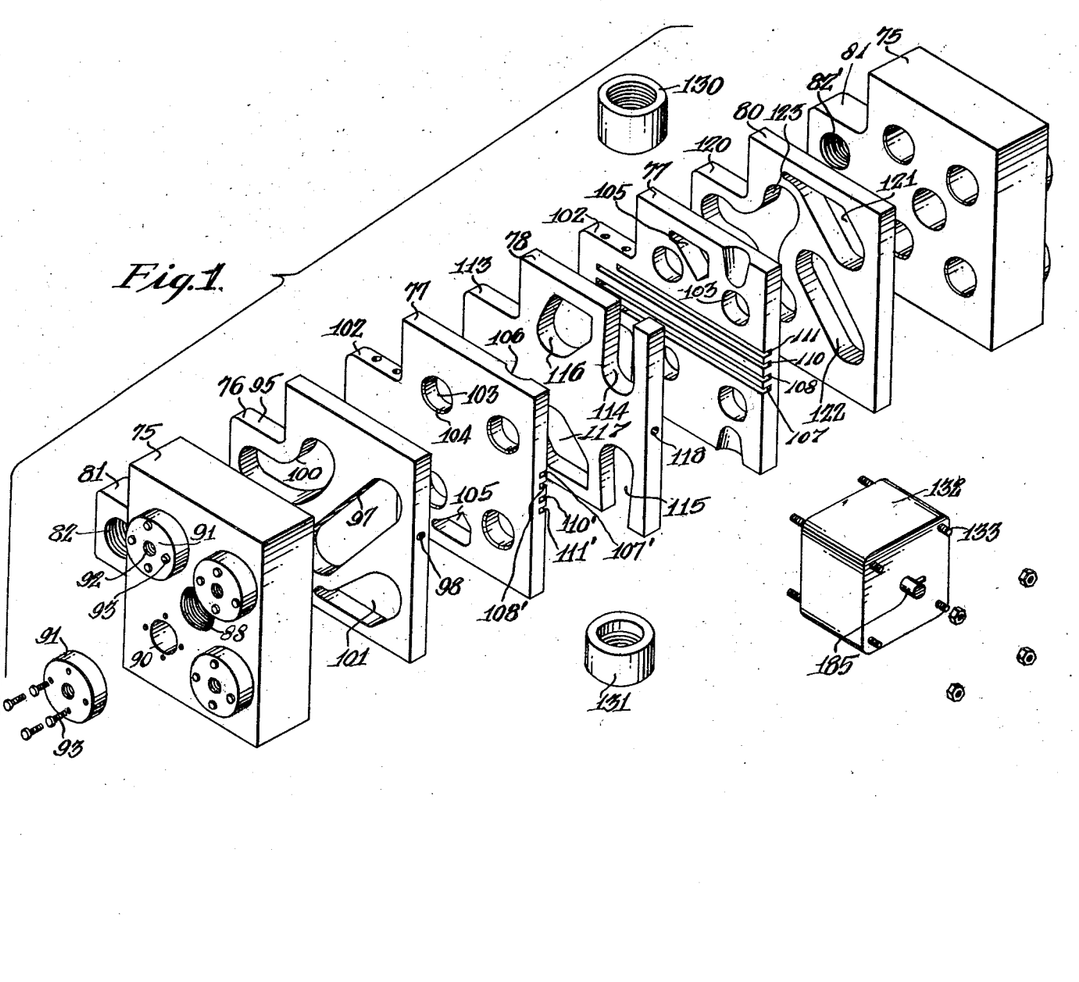
Figure 1 is an exploded perspective of the preferred embodiment of the valve of the invention.

Considering now the structure of Figures 1 to 33 in the preferred embodiment, the valve of the invention consists of end plates 75, a first port plate 76, seat plates 77 which are suitably identical plates reversed, a second port plate 78, and a third port plate 80, arranged in the order shown in Figure 1.

Each of the end plates 75 has a lug 81 at the back which is suitably bored and threaded at 82 to receive a pipe connection communicating clear through the lug. The end plates are respectively reversed so that the inside in each instance is the small end of the taper of the thread. Aside from the lug, the rest of the end plate is suitably rectangular, as shown, comprising a front wall 83, a top wall 84, a bottom wall 85, a rear wall 86 and end walls 87 one of which is united as by self-bonding after softening of the plastic to the next innermost plate. Each end plate 75 has at the center an opening 88 extending clear through and threaded to receive a pipe connection from the outside.

Suitably at four equally spaced positions, the end plates have bores or openings 90 extending clear through to form pilot cylinders, the pilot cylinders being closed at the outer ends by cover plates 91 having openings 92 at the center to receive threaded pipe connections and suitably attached by screws 93. Gaskets 94 in recesses in the closures seal the closures in place against the plates to prevent leakage.

Figure 9:
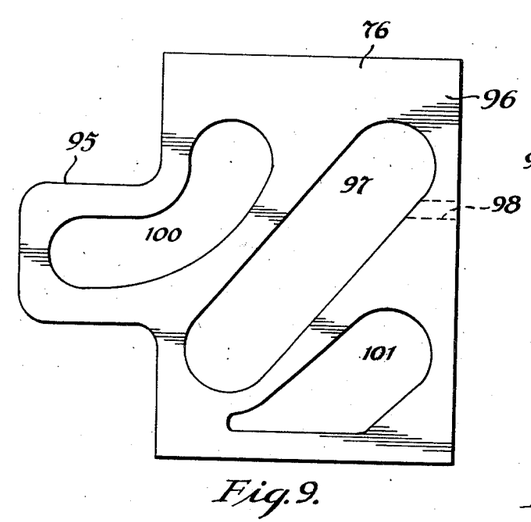
Figure 9 is an end elevation of the lefthand port plate of Figure 1.
Figure 10:
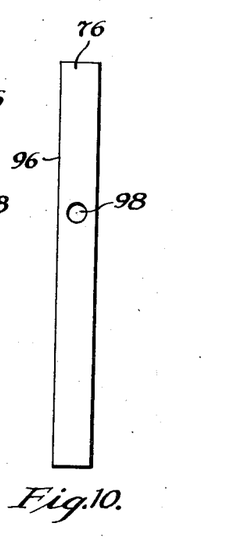
Figure 10 is a front elevation of Figure 9.

Next to the end plates 75 on the left in Figure 1 is port plate 76, shown more in detail in Figures 9 and 10. The port plate is rectangular of the same contour as the end plates at the outside, but suitably thinner, and has a lug 95 at the back in line with the lug 81 on the end plate. The ends 96 of the port plate 76 are suitably smooth, as are the ends of the end plate, and good registry is made between the outside of the port plate and the inside of the end plate.

At positions corresponding to the positions of the cylinders 90 in the end plate, the port plate 76 has openings, but the openings are of much larger extent than the cylinder openings 90. Thus a diagonally extending slot 97 passes clear through the port plate from the upper front to the lower rear and has a diameter at the two ends in line with the cylinders 90 which is larger than that of the cylinders. A passage 98 from the interior of the slot 97 extends to the front of the valve casing and connects with the pilot valve as later explained. At the upper rear the port plate also has an arcuate slot 100 clear through which extends out into the lug in line with the opening 82 through the end plate. In the lower forward corner the port plate has a slot 101 clear through which extends diagonally downwardly and rearwardly to connect with another slot in the valve seat plate as later explained.

Figures 11, 12, 13:
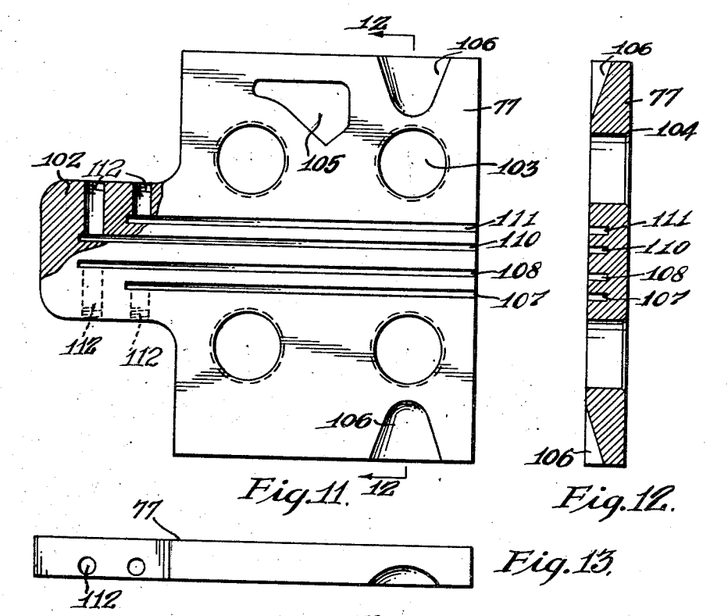
Figure 11 is an end elevation of one of the valve plates of Figure 1, looking from the center of the valve, and partly broken away.
Figure 12 is a section on the line 12—12 of Figure 11.
Figure 13 is a top plan view of Figure 11.
Figure 14:
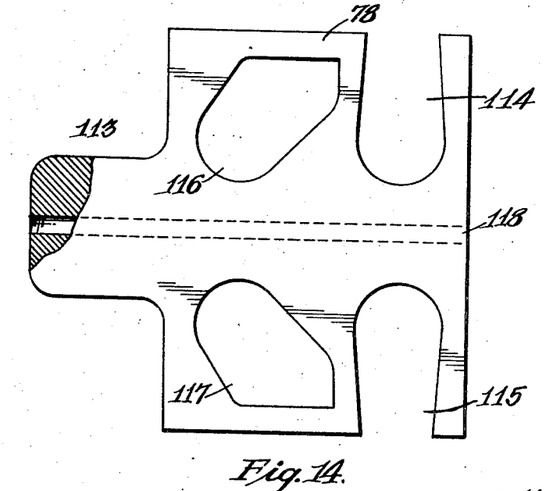
Figure 14 is an end elevation, partly broken away, of the middle port plate of Figure 1.
Figure 15:
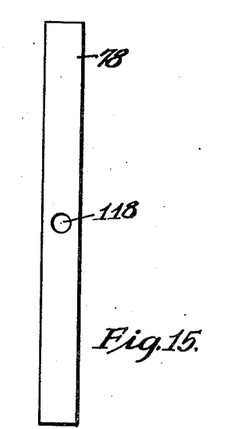
Figure 15 is a front elevation of Figure 14.

The valve seat plate 77, of which two in opposite counterpart positions are used, are generally rectangular, as shown in Figures 11 to 13, and have lugs 102, the outer confines being the same as that of the end plates and the port plate 76. Holes 103 extend clear through the valve seat plates and have annular shoulders 104 to guide the valve elements. These holes are suitably of the same diameter as the cylinders 90, in line therewith, and function as valve seats.

Each of the valve seat plates has a slot 105 which is desirably of generally triangular form and extends clear through at a position from the lower rear below the lower rear seat to a position between the lower seats in the lefthand seat plate, and opposite counterpart in the righthand seat plate. A downwardly or upwardly widening and deepening slot 106 is provided in each of the seat plates on the faces adjoining one another above and below the front seats to guide flow at top and bottom fluid connections later to be mentioned. A series of slots 107, 108, 110 and 111 (or 107', 108', 110' and 111') runs from front to back at the middle and each of the slots connects to one of the bores 112 on the lug 102, threaded to receive a pipe connection.

Between the seat plates 77 the middle port plate 78 is provided, with the same outer contour as the other plates, and the lug 113 at the back. At the top and the bottom, slots 114 and 115 extend from the upper and lower edges clear through the middle port plate into positions in line with the cylinders 90. At the rear slots 116 and 117 clear through the middle port plate have a diameter larger than the cylinders in line therewith and extend respectively diagonally forwardly, and downwardly or upwardly as the case may be.

A passage 118 from front to back extends through the port plate without making any lateral communication and has threads at the rear to make a pipe connection to the drain as later explained.

Figure 16:
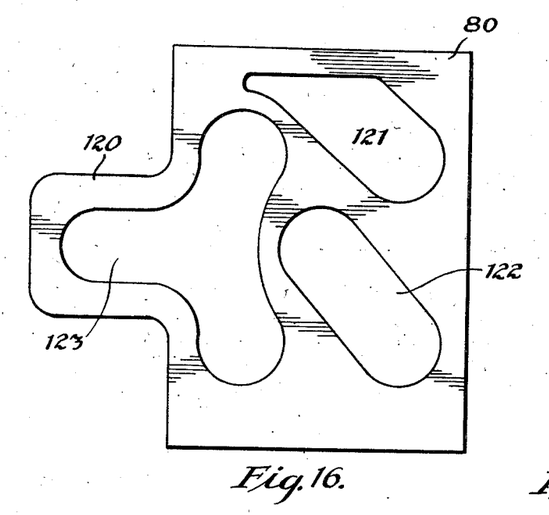
Figure 16 is an end elevation of the righthand port plate of Figure 1.
Figure 17:
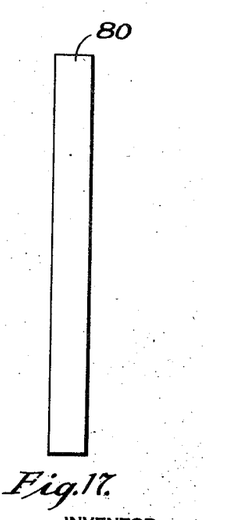
Figure 17 is a front elevation of Figure 16.
Figure 18:
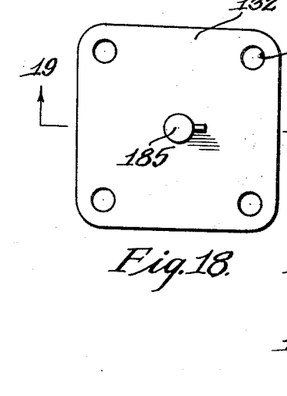
Figure 18 is a front elevation of the pilot valve employed in Figure 1.

Between the righthand valve seat plate and the righthand end plate of Figure 1, there is a port plate 80, best seen in Figures 16 and 17. This has the same outer contour as the other plates and has the lug 120 at the back.

The port plate 80 has a slot 121 clear through in line with the forward upper cylinder 90. This slot extends upwardly and rearwardly. There is also a slot 122 clear through the port plate having a diameter larger than the cylinder 90 in line with the lower forward cylinder and extending upwardly and rearwardly to the center.

There is also a clover-shaped slot 123 clear through the port plate having a size larger than the upper and lower rear cylinders 90 in line therewith and extending into the lug in line with the opening 82 on the adjoining end plate.

Figure 2:
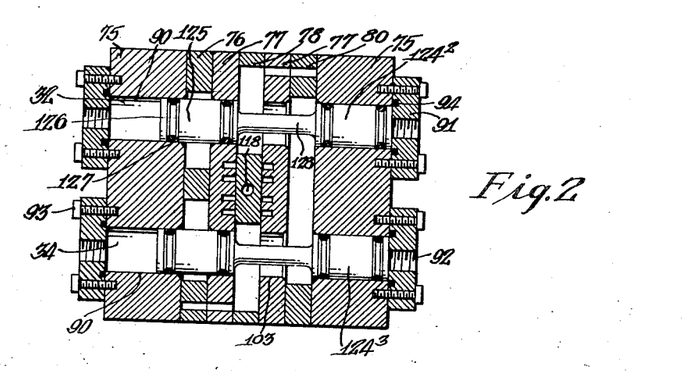
Figure 2 is a section of the preferred embodiment on the line 2—2 of Figure 5, the section extending across the rear pair of two-way valves.
Figure 4:
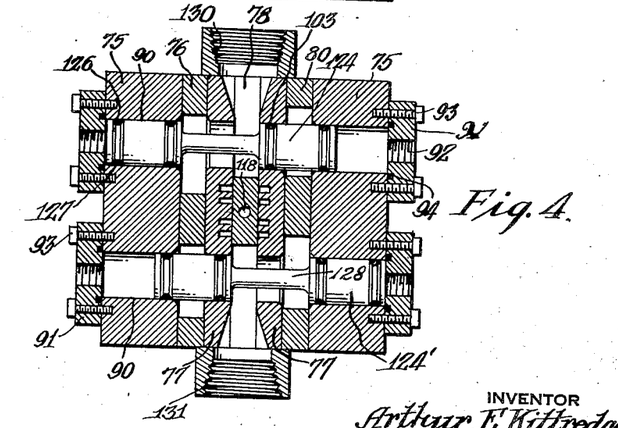
Figure 4 is a section of the preferred embodiment on the line 4—4 of Figure 5, through the front pair of three-way valves.

Thus it will be seen that the cylinders 90 and the valve seats 103 in line therewith and the corresponding passages in the port plates provide passages extending clear through from end to end to receive four three-way valve elements 124, Figures 2 and 4, which are generally of dumbbell shape, having piston ends 125 provided with annular slots 126 receiving O-ring packings 127 and having reduced intermediate connecting portions 128. The lengths of the pistons and the connecting portions are such as seen in Figures 2 and 4 that with the valve in the righthand positions the lefthand port is closed and the righthand port and intermediate port communicate, while with the valve in the lefthand position the righthand port is closed and the lefthand port and the intermediate port communicate.

Figure 5:
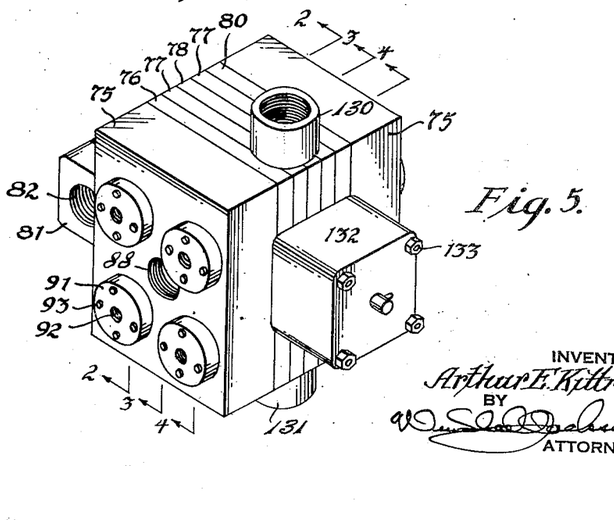
Figure 5 is a perspective of the valve of Figure 1.
Figure 6:
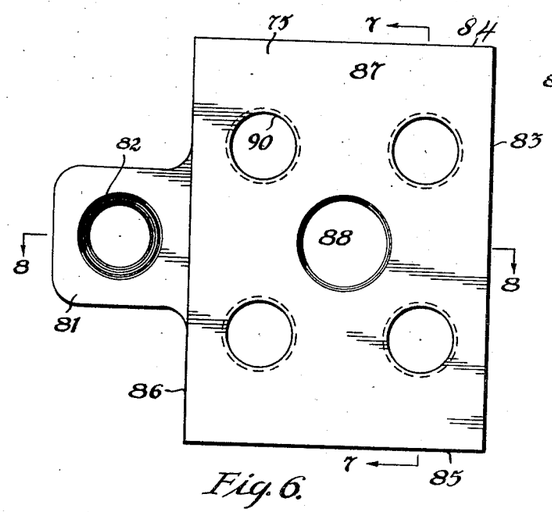
Figure 6 is an end elevation of one of the end plates employed in the valve of Figure 1.
Figure 7:
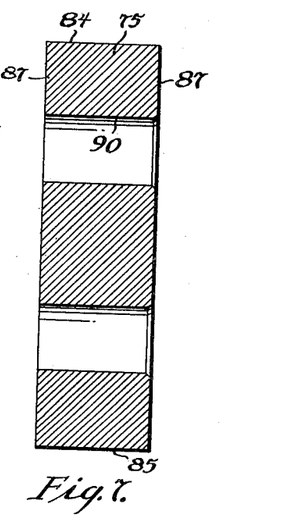
Figure 7 is a section on the line 7—7 of Figure 6.
Figure 8:
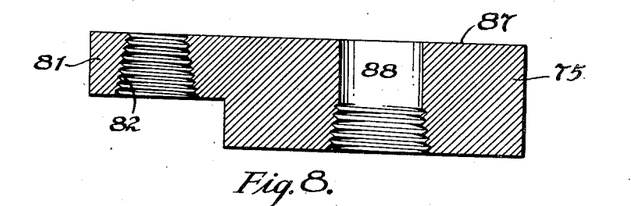
Figure 8 is a section on the line 8—8 of Figure 6.

Connectors 130 and 131, Figures 1, 4 and 5, are provided to make threaded connection between pipe fittings and the top and bottom center openings at 114 and 115 in the central port plate.

The assembly of the valve is desirably accomplished by softening the adjoining end surfaces of the various plastic plates with solvent and pressing the plates together in a stack suitably at elevated temperature until they self-bond. If desired a suitable adhesive may be applied which is not affected by water. The plastic connectors 130 and 131 are similarly applied, preferably by softening them with a solvent and pressing them against the top and bottom of the assembled valve until they bond.

The closures on the ends of the cylinders are, however, preferably not cemented in place so that they can be removed to remove or inspect the valves, by loosening the screws 93.

The pilot valve according to the invention is best seen in Figures 1, 5 and 18 to 29 inclusive.

A pilot valve housing 132, suitably of hollow rectangular form, is secured to the front of the assembled valve by studs 133 threaded into the valve plates, and passing through openings 133' in the housing. The housing has a cylindrical bore 134 closed at one end by a front wall 135 and has a cylindrical central counterbore 136 connecting to the bore by a shoulder 137.

The housing has a forwardly extending passage 138 extending from a position in line with the passage 98 and bending to enter the bore 134 at 140 near the forward end. A seal to passage 98 is made by gasket 141 in a gasket recess.

The pilot valve seat assembly consists of a pilot valve seat plate 142, a pilot valve port plate 143 and a pilot valve matching plate 144 which are side by side in that order from front to back and desirably cemented together as by solvent softening of the plastic and pressing the surfaces together. The plates are kept in registry by pins 145 passing through aligned openings 146 in all of the plates, Figures 20 and 27 to 29.

Figures 27, 28:
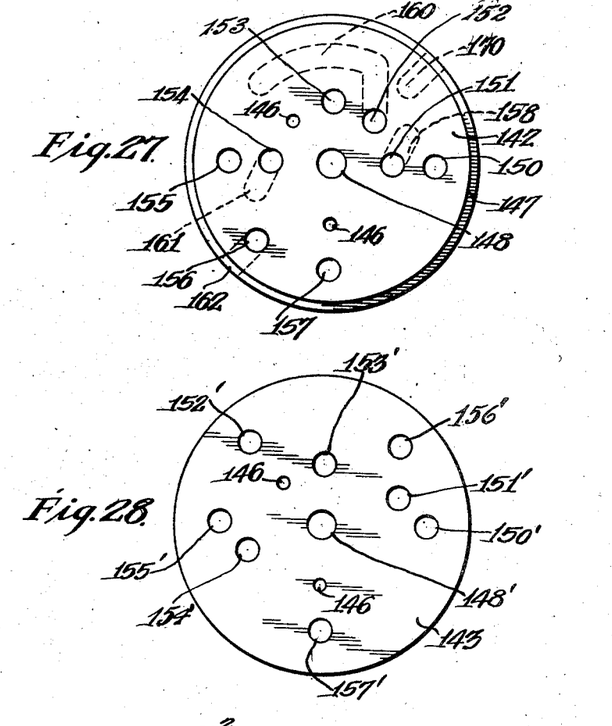
Figure 27 is a front elevation of the pilot valve seat plate.
Figure 28 is a front elevation of the port plate.

The seat plate 142 is seen from the front in Figure 27. It has an annular slot 147 around the edge near the front which receives a rubber O-ring 149 to seal in the shoulder 137. The seat plate is cylindrical and has a central longitudinal opening 148 for the drain, and a series of longitudinal valve seat openings 150 to 157 inclusive passing clear through the seat plate. Seat openings 150, 153 155 and 157 are simply straight bores. Seat opening 151 communicates with a slot 158 at the rear which extends up and to the right for a short distance. Seat 152 communicates with a slot 160 on its rear surface which extends up and to the left. Seat 154 communicates with a slot 161 on the rear surface which extends down and to the left. Seat 156 communicates with a radially outwardly directed slot 162 at the back. There is also a radially inwardly directed slot 170 at a diametral opposite position to slot 162 on the rear surface of the seat plate.

The seat plate registers with port plate 143, best seen in Figure 28, which has a central longitudinal drain opening 148' which communicates directly in line with opening 148 in the seat plate, and also has longitudinal through bores 150', 151', 156', 153', 152', 155', 154' and 157' which respectively communicate with the corresponding seat openings directly or through the slots. It will be seen that in every case the communication is through a bore or a bore through one of the slots on the back except in the case of seat opening 156 which communicates through radial slots 162 and 170 and annular space 171 between the valve seat plate and the housing.

Figure 19:
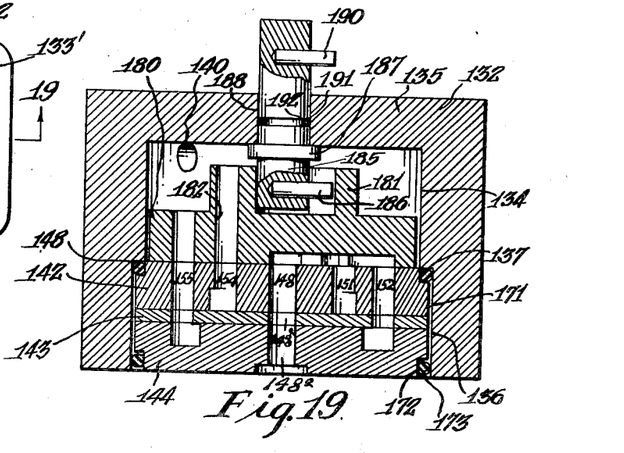
Figure 19 is a section on the line 19—19 of Figure 18.
Figure 20:
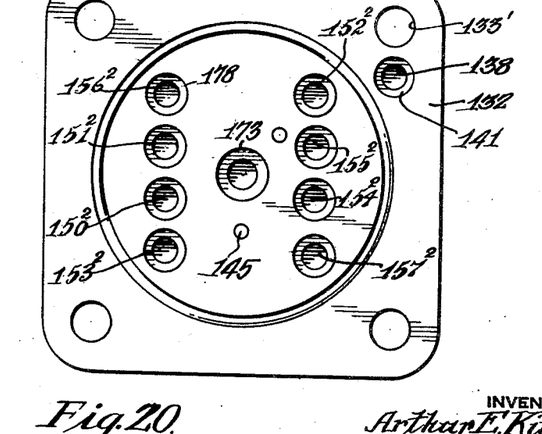
Figure 20 is a rear elevation of the pilot valve of Figures 18 and 19.
Figure 21:
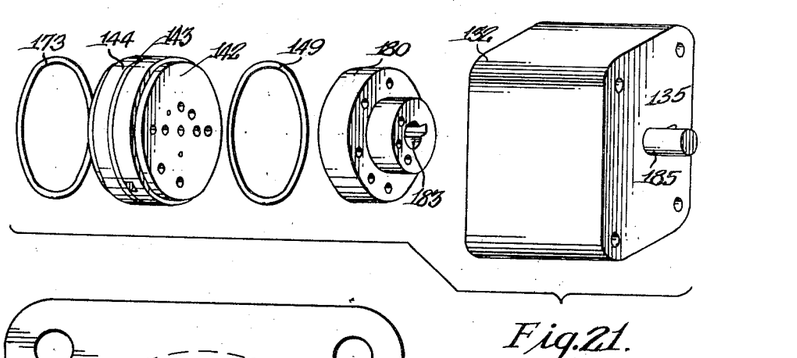
Figure 21 is an exploded perspective of the pilot valve of Figures 18 to 20.
Figure 22:
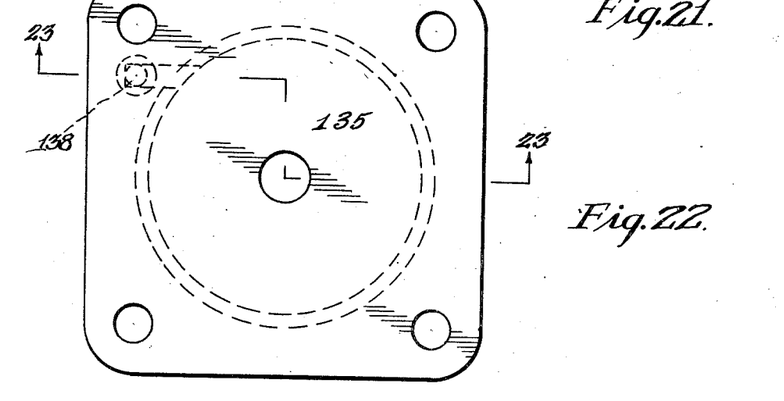
Figure 22 is a detailed front elevation of the pilot valve housing alone.
Figure 23:
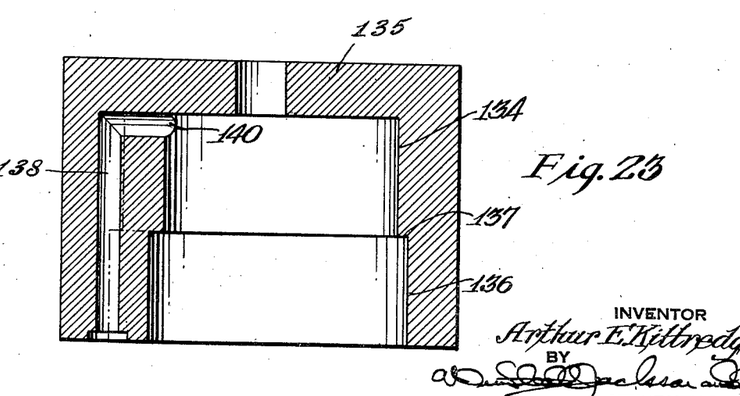
Figure 23 is a staggered section on the line 23—23 of Figure 22.
Figure 24:
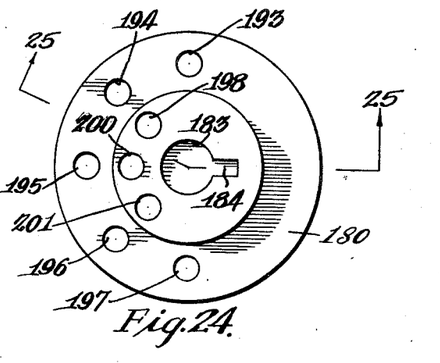
Figure 24 is a front elevation of the pilot valve element.
Figure 25:
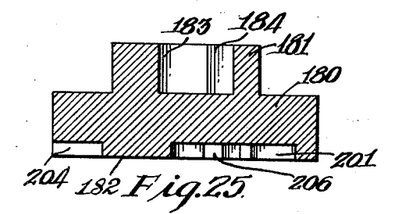
Figure 25 is a staggered section on the line 25—25 of Figure 24.
Figure 29:
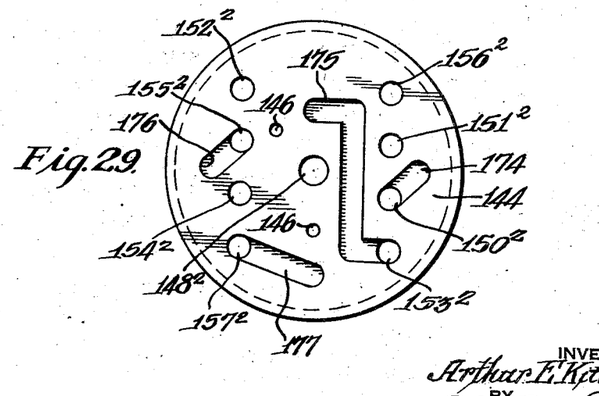
Figure 29 is a front elevation of the pilot valve matching plate.

The matching plate 144 seen in Figure 29 has an annular slot 172, Figure 19, around its rearward edge which receives rubber sealing O-ring 173 engaging the cylindrical wall of the counterbore. The matching plate has a central longitudinal drain opening $148^2$ which seals by rubber gasket 173 with the forward end of drain passage 118. The matching plate also has passages $153^2$, $150^2$, $151^2$, $156^2$, $152^2$, $155^2$, $154^2$ and $157^2$ which communicate with the seats of corresponding numbers, in most cases by bores clear through, but in some instances by such bores plus slots. Thus there is a slot 174 at the front of the matching plate connecting passage 150' with passage $150^2$, a similar slot 175 connecting passage 153' with the passage $153^2$, a similar slot 176 connecting passage 155' with passage $155^2$ and a slot 177 connecting passage 157' with passage $157^2$. The passages eventually are brought in line with the slots 107, 108, 110 and 111 on each seat plate through the seat plates of the three-way valves and sealed by gaskets 178 in suitable recesses in the matching plate.

The seat plate engages at the front on a rotary valve element 180 having a hub 181 and a plate valve face 182. The hub at the front has a socket 183 and a key slot 184 to receive the lower end of a stub shaft 185 having a protruding pin 186 in the key slot. The stub shaft has a shoulder 187 engaging on the inside of the front wall 135 of the housing and then passes through an opening 188 in the housing and extends beyond, carrying a side pin 190 for engagement by an operating handle if the device is to be manipulated by hand or the coupling of a motor if the device is to be manipulated electrically. A rubber O-ring 191 in an annular recess 192 of the shaft seals against leakage around the shaft.

Extending longitudinally through the valve from front to back are a series of arcuately distributed ports 193, 194, 195, 196, 197, 198, 200 and 201. The passages 193 to 197 have between them radially inwardly extending slots 202, 203, 204 and 205 in the valve face.

Figure 26:
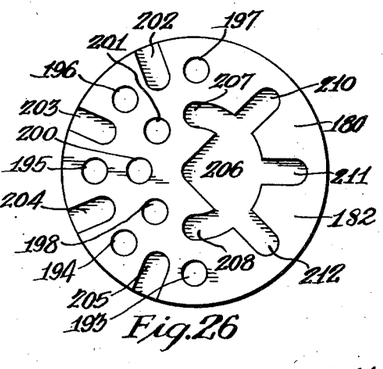
Figure 26 is a rear elevation of the pilot valve element.

The valve face also has a segmental slot 206 in its face, having arcuate extensions 207 and 208 and radial outer extensions 210, 211 and 212 as best seen in Figure 26.

Figure 3:
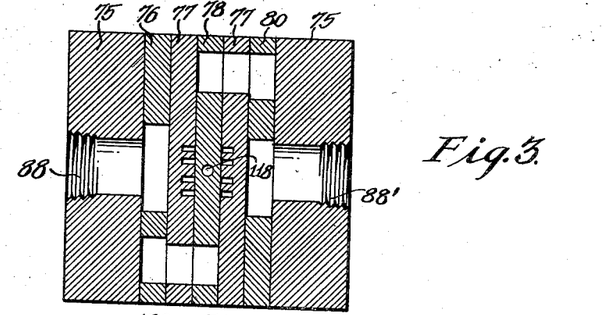
Figure 3 is a section of the preferred embodiment on the line 3—3 of Figure 5, the section extending through the end connections.

In operation when the structure is assembled as shown, the connection 82 of the lefthand end plate of Figures 1 and 5 is connected to the regenerant solution, suitably through an eductor which maintains pressure constantly. The corresponding connection 82 on the righthand end plate is connected to the drain or waste water connection. The lefthand connection 88 as seen in Figure 3 is to the service water inlet and the righthand connection 88' is to the service water outlet. The top connection 130 extends to the top of the ion exchanger and the bottom connection 131 is to the bottom of the ion exchanger.

Figure 30:
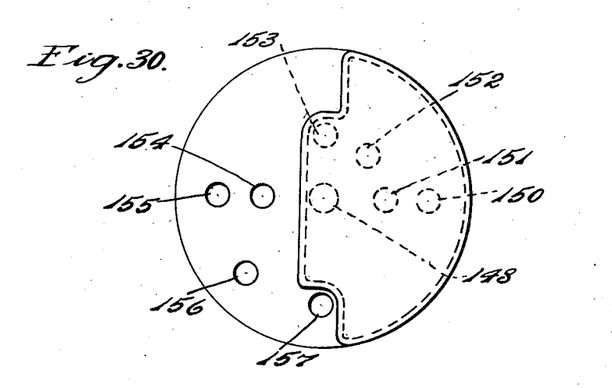
Figures 30 to 33 are diagrams showing the pilot valve in the respective operating positions.

To place the valves in service position, the pilot valve is adjusted to the position of Figure 30, in which case pilot pressure is applied through pilot valve passages 197, 196, 195 and 200 to pilot valve seats 157, 156, 155 and 154 respectively which pass through to matching plate passages $157^2$, $156^2$, $155^2$, and $154^2$ respectively which connect to slots 111', 111', 108' and 110'. The pressure from seat 156 throws valve 124 to the left in Figure 4, connecting the service water inlet at 88 with the connection to the top of the ion exchanger at 130. Pilot pressure applied to seat 154 throws pilot valve 124' to the right in Figure 4, connecting the service water outlet 88' with the connection to the bottom of the ion exchanger at 131.

Pilot pressure applied to pilot valve seat 155 throws three-way valve $124^2$ to the right in Figure 2, connecting the intermediate port of the three-way valve through slot 116 and slot 105 to the drain at 82' so that if any leakage of regenerant solution occurs it will pass to the drain.

Likewise the application of pilot pressure to pilot valve seat 157 shifts three-way valve $124^3$ of Figure 2 to the right, connecting center port 117 to the drain at 82' through slot 123.

At the same time, pilot valve recesses 206 and its tributary slots connect the opposite ends of the three-way valves from those that are energized to drain passage 148.

Figure 31:
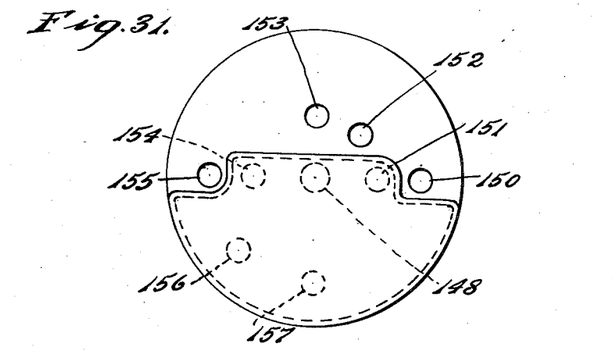

When the pilot valve is shifted to backwash position as in Figure 31, three-way valve 124 is thrown to the right, causing connection of the intermediate port of this valve which is connected to the top of the ion exchanger to the intermediate port of three-way valve $124^2$. Three-way valve $124^2$ is thrown to the right causing connection from its intermediate port to the drain. Three-way valve 124' is thrown to the left opening connection from its intermediate passage to the intermediate passage of three-way valve $124^3$ and three-way valve $124^3$ is thrown to the left connecting its intermediate passage to the service water inlet. The opposite ends of the cylinders are connected to drain by the recess 206 of the pilot valve and its tributaries.

Figure 32:
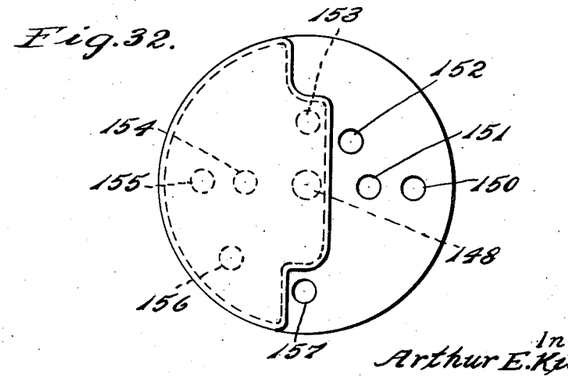

For regenerant admission, the pilot valve is in the position of Figure 32 in which case three-way valve 124 is thrown to the right, causing connection from the top of the ion exchanger to the intermediate port of three-way valve $124^2$ which is thrown to the left admitting regenerant. Three-way valve 124' is thrown to the left connecting the bottom of the ion exchanger to the intermediate port of three-way valve $124^3$ which is thrown to the right to connect to drain.

Figure 33:
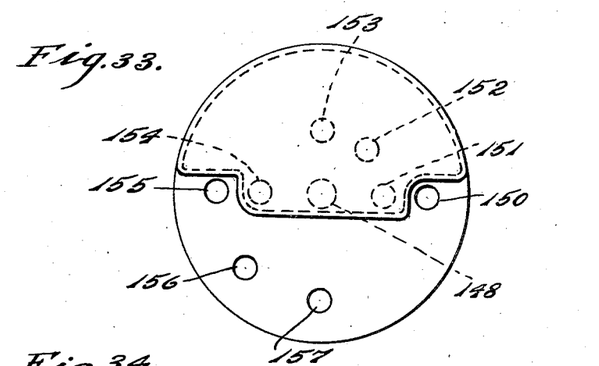

For rinse the pilot valve is in the position of Figure 33, connecting pilot valve pressure to throw three-way valve 124 to the left, connecting the top of the ion exchanger with the service water inlet, while three-way valve 124' is thrown to the left connecting the bottom of the ion exchanger with the intermediate port of three-way valve $124^3$ which is thrown to the right and thus connected to drain. Three-way valve $124^2$ is thrown to the right, thus connecting its intermediate port to drain so that any leakage of regenerant solution would be to the drain. The opposite ends of the cylinders are exhausted to drain through the recess 206 in the pilot valve.

It will be evident that each successive stage in the operation is produced by a 90° clockwise rotation of the pilot valve.

It will thus be evident that the operation in accordance with the present invention provides all the advantages of arrangements which have required separate valves to control each different admission or discharge, adding greatly to the expense. It will also be evident that the device of the invention provides greater flexibility than is possible where special ports are engaged by rotating members as they advance in the sequence to make the main valve connections.

Figure 35:
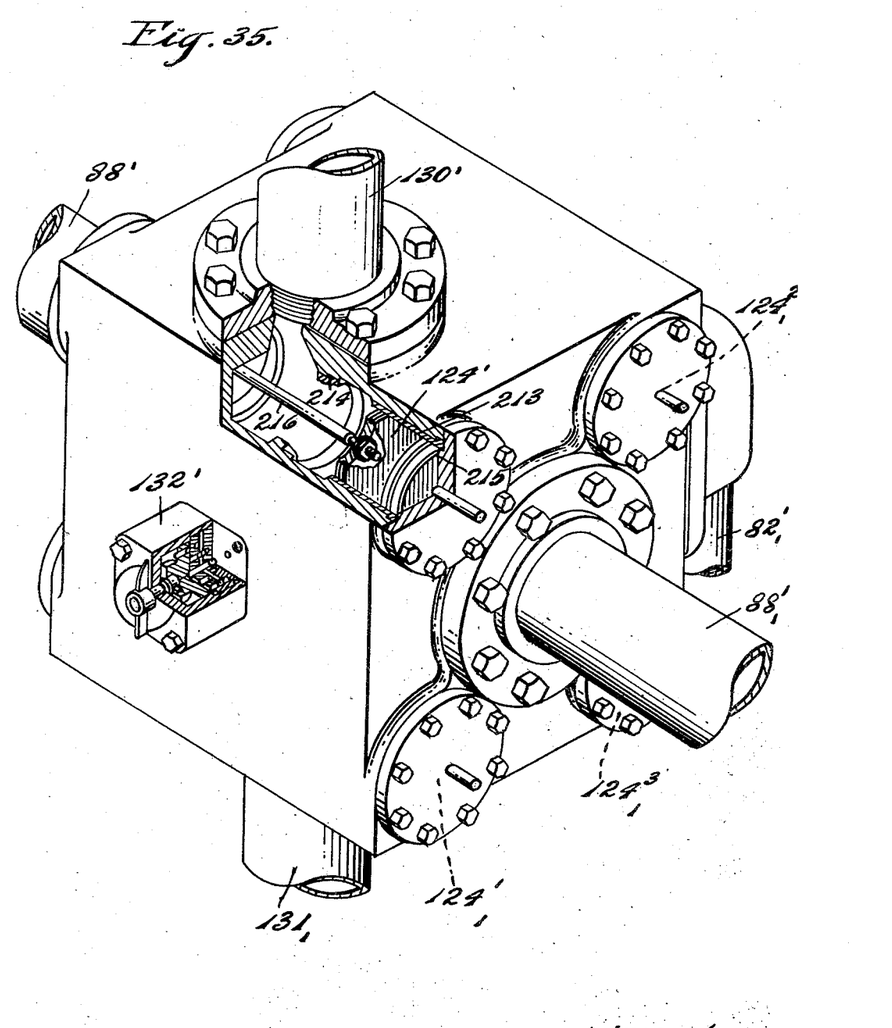
Figure 35 is a perspective of a further modification of the valve of the invention, partly sectioned away to show the interior.

Instead of assembling the valve and pilot valve from separate plates, they may be made from cast housings as in Figure 35, showing a design which is similar to that already described, with subscripts used to distinguish similar parts. The valves 124, 124', $124^2$ and $124^3$, operate in the same way, and have the same passages as those earlier described, except that they have separated valve elements 213 on each valve operating between opposed seats 214 and 215 at opposite ends, and connected by rods 216.

In view of my invention and disclosure variations and modifications to meet individual whim or particular need will doubtless become evident to others skilled in the art, to obtain all or part of the benefits of my invention without copying the apparatus shown, and I therefore claim all such insofar as they fall within the reasonable spirit and scope of my claims.

Having thus described my invention, what I claim as new and desire to secure by Letters Patent is:

1. An ion exchange control valve comprising a valve body, four three-way valves in the valve body, each having an intermediate port and outside ports which in opposite limiting positions are alternatively connected to the intermediate port, the first three-way valve having one outside port connected to the intermediate port of the third three-way valve, and the second three-way valve having one outside port connected to the intermediate port of the fourth three-way valve, fluid pilot passages through the valve body to the opposite ends of the three-way valves for shifting the three-way valves back and forth and a rotary pilot valve in the body controlling the fluid pilot pressure connections, having one position of the pilot valve in which each of the three-way valves has been shifted to one position, having a second position of the pilot valve in which the first three-way valve is shifted to the opposite position, the second three-way valve is shifted to the opposite position, the third three-way valve remains in the one position and the fourth three-way valve is shifted to the opposite position, having a third position of the pilot valve in which the first three-way valve is shifted to the opposite position, the second three-way valve is shifted to the opposite position, the third three-way valve is shifted to the opposite position, and the fourth three-way valve is shifted to the one position and having a fourth position of the pilot valve in which the first three-way valve is shifted to the one position, the second three-way valve is shifted to the opposite position, the third three-way valve is shifted to the one position and the fourth three-way valve is shifted to the one position.

2. In a pilot valve, a housing, a valve seat plate in the housing closing one end of the housing, having a plurality of valve seats, a rotary valve in the housing engaging and cooperating with the seat plate, having a plurality of openings which communicate with valve seats, surfaces closing valve seats and a cavity which interconnects a number of valve seats, a port plate on the side of the seat plate remote from the valve having passages which connect with the openings through the seats and direct the same angularly and a matching plate in the housing on the side of the port plate remote from the valve, having passages which communicate with the port plate and angularly direct some of the passages in the port plate and having openings through the matching plate which are adapted to communicate with fluid connections, there being a connection into the housing around the valve on the side remote from the seat.

3. In a pilot valve, a housing, a valve seat plate in the housing closing one end of the housing, having a plurality of valve seats, a rotary valve in the housing engaging and cooperating with the seat plate, having a plurality of openings which communicate with valve seats, surfaces closing valve seats and a cavity which interconnects a number of valve seats, a port plate on the side of the seat plate remote from the valve having passages which connect with the openings through the seats and direct the same angularly and a matching plate in the housing on the side of the port plate remote from the valve, having passages which communicate with the port plate and angularly direct some of the passages in the port plate and having openings through the matching plate which are adapted to communicate with fluid connections, there being a connection into the housing around the valve on the side remote from the seat, the valve having at certain points inner extensions communicating with the outside rim of the valve to admit pressure to certain seats.

4. In an ion exchange control valve system, four independent 3-way valves, each having an intermediate port and two outside ports which are connected alternatively to the intermediate port in the two opposing positions of each valve, the first 3-way valve having a top ion exchanger intermediate port and a service water inlet outside port, connection means from the other outside port of the first 3-way valve to the intermediate port of the third 3-way valve, the second 3-way valve having a bottom ion exchanger intermediate port and a service water outlet outside port, connection means from the other outside port of the second 3-way valve to the intermediate port of the fourth 3-way valve, the third 3-way valve having a regenerant outside port and a drain outside port, and the fourth 3-way valve having a service water inlet outside port and a drain outside port; means for throwing the first 3-way valve to the position in which the service water inlet outside port is in communication with the intermediate port, for throwing the second 3-way valve to the position in which the service water outlet outside port is in communication with the intermediate port and for throwing the third 3-way valve to the position in which the drain outside port is in communication with the intermediate port and for throwing the fourth 3-way valve at the same time to the position in which the drain outside port is in communication with the intermediate port; means for throwing the first 3-way valve to the position in which the intermediate port is in communication with the outside port which connects with the intermediate port of the third 3-way valve, for throwing the second 3-way valve to the position in which the outside port which is connected with the intermediate port of the fourth 3-way valve is in communication with its own intermediate port, for throwing the third 3-way valve to the position in which the drain outside port is in communication with its own intermediate port, and for throwing the fourth 3-way valve to the position in which the service water inlet outside port is in communication with its own intermediate port; means for shifting the first 3-way valve to the position in which the outside port connected to the intermediate port of the third 3-way valve, is in communication with its own intermediate port, for shifting the second 3-way valve to the position in which the outside port in communication with the intermediate port of the fourth 3-way valve is in communication with its own intermediate port, for shifting the third 3-way valve to the position in which the regenerant outside port is in communication with its own intermediate port, and for shifting the fourth 3-way valve to the position in which the drain outside port is in communication with its own intermediate port; and means for shifting the first 3-way valve to the position in which the service water inlet outside port is in communication with its own intermediate port, for throwing the second 3-way valve to the position in which the outside port connected to the intermediate port of the fourth 3-way valve is in communication with its own intermediate port, for shifting the third 3-way valve to the position in which the drain outside port is in communication with its own intermediate port and for shifting the fourth 3-way valve to the position in which the drain outside port is in communication with its own intermediate port.

5. In an ion exchange control valve system, four independent 3-way valves, each having an intermediate port and two outside ports which are connected alternatively to the intermediate port in the two opposing positions of each valve, the first 3-way valve having a top ion exchanger intermediate port and a service water inlet outside port, connection means from the other outside port of the first 3-way valve to the intermediate port of the third 3-way valve, the second 3-way valve having a bottom ion exchanger intermediate port and a service water outlet outside port, connection means from the other outside port of the second 3-way valve to the intermediate port of the fourth 3-way valve, the third 3-way valve having a regenerant outside port and a drain outside port, and the fourth 3-way valve having a service water inlet outside port and a drain outside port, and pilot fluid means for shifting the 3-way valves into their opposite positions, including a pilot valve exercising control of all the 3-way valves for shifting the first 3-way valve to the position in which the intermediate port is connected to the service water inlet outside port, for shifting the second 3-way valve to the position in which the intermediate port is connected to the service water outlet outside port and for shifting the third 3-way valve to the position in which the intermediate port is connected to the drain outside port.

6. An ion exchange control valve system of claim 5, in which the pilot fluid means includes means for shifting the fourth 3-way valve to the position in which the intermediate port is connected to the drain outside port.

7. In an ion exchange control valve system, four independent 3-way valves, each having an intermediate port and two outside ports which are connected alternatively to the intermediate port in the two opposing positions of each valve, the first 3-way valve having a top ion exchanger intermediate port and a service water inlet outside port, connection means from the other outside port of the first 3-way valve to the intermediate port of the third 3-way valve, the second 3-way valve having a bottom ion exchanger intermediate port and a service water outlet outside port, connection means from the other outside port of the second 3-way valve to the intermediate port of the fourth 3-way valve, the third 3-way valve having a regenerant outside port and a drain outside port, and the fourth 3-way valve having a service water inlet outside port and a drain outside port, in combination with pilot fluid means for shifting the 3-way valves, including a pilot valve exercising control of all 3-way valves, for shifting the first 3-way valve to the position in which the intermediate port is connected to the service water inlet outside port, for shifting the second 3-way valve to the position in which the intermediate port is connected to the service water outlet outside port, for shifting the third 3-way valve to the position in which the intermediate port is connected to the drain outside port, and for shifting the fourth 3-way valve to the position in which the intermediate port is connected to the drain outside port, including means for shifting the first 3-way valve to the position in which the intermediate port connects with the outside port which is connected with the intermediate port of the third 3-way valve, for shifting the second 3-way valve to the position in which the intermediate port connects with the outside port which connects with the intermediate port of the fourth 3-way valve, for shifting the third 3-way valve to the position in which the intermediate port connects with the drain outside port and for shifting the fourth 3-way valve to the position in which the service water inlet outside port connects with its own intermediate port; including means for shifting the first 3-way valve to the position in which the intermediate port connects with the outside port which connects to the intermediate port of the third 3-way valve, for shifting the second 3-way valve to the position in which the intermediate port connects to the outside port which in turns connects to the intermediate port of the fourth 3-way valve, for shifting the third 3-way valve to the position in which the intermediate port connects with the regenerant outside port and for shifting the fourth 3-way valve to the position in which the intermediate port connects with the drain outside port; and including means for throwing the first 3-way valve to the position in which the intermediate port connects to the service water inlet outside port, for shifting the second 3-way valve to the position in which the intermediate port connects with the outside port which in turn connects with the intermediate port of the fourth 3-way valve, for shifting the third 3-way valve to the position in which the intermediate port connects with the drain outside port and for throwing the fourth 3-way valve to the position in which the intermediate port connects with the drain outside port.

8. A valve comprising a stack of plates extending out to the outside of the valve and cooperating in lateral engagement to form a valve housing, the plates including end plates, valve port plates adjoining the end plates on the sides towards the opposite ends, valve closure plates adjoining the valve port plates on the sides toward the opposite ends, an intermediate port plate between the valve closure plates, the plates having longitudinally extending openings in line, valves in the openings moving transversely to the plates and in selected positions engaging in and sealing with one or the other of the valve closure plates, there being connecting ports in the valve port plates which conduct flow from one valve to another, the end plates having lugs at one side and the port plates having lugs, inlet connections extending through the lugs at the end plates, there being connecting passages with the inlet connections on the lugs of the adjoining port plates, the connecting passages communicating with the valves, outlet connections at the edges of the seat plates, there being an outlet connection at the edge of a port plate between the seat plates.

References Cited in the file of this patent
UNITED STATES PATENTS

| | | |
|---|---|---|
| 679,767 | Mears | Aug. 6, 1901 |
| 1,652,710 | Dotterweich | Dec. 13, 1927 |
| 2,054,259 | Kinzie | Sept. 15, 1936 |
| 2,076,321 | Pick | Apr. 6, 1937 |
| 2,157,240 | Keel | May 9, 1939 |
| 2,243,815 | Griswold | May 27, 1941 |
| 2,354,694 | McGill et al. | Aug. 1, 1944 |
| 2,614,503 | Berry | Oct. 21, 1952 |
| 2,747,611 | Hewitt | May 29, 1956 |